United States Patent
Chen et al.

(10) Patent No.: US 7,440,225 B1
(45) Date of Patent: Oct. 21, 2008

(54) DISK DRIVE EMPLOYING PIVOT FRICTION COMPENSATION

(75) Inventors: Min Chen, San Rafael, CA (US); Zhi Wang, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 64 days.

(21) Appl. No.: 11/507,234

(22) Filed: Aug. 21, 2006

(51) Int. Cl.
*G11B 5/596* (2006.01)

(52) U.S. Cl. .................................. 360/78.04; 360/78.09

(58) Field of Classification Search ........................ None
See application file for complete search history.

(56) References Cited

U.S. PATENT DOCUMENTS

| | | | |
|---|---|---|---|
| 4,979,055 A * | 12/1990 | Squires et al. ................. | 360/69 |
| 5,905,705 A | 5/1999 | Takeda et al. | |
| 6,067,202 A | 5/2000 | Rowan et al. | |
| 6,606,214 B1 | 8/2003 | Liu et al. | |
| 6,710,957 B2 | 3/2004 | Nakasato | |
| 6,754,025 B1 | 6/2004 | Shepherd et al. | |
| 6,765,747 B1 | 7/2004 | Sun et al. | |
| 6,937,430 B2 * | 8/2005 | Ge et al. .................. | 360/78.06 |
| 6,940,685 B2 | 9/2005 | Chrappan Soldavini et al. | |
| 6,950,274 B2 | 9/2005 | Inaji et al. | |
| 6,972,540 B1 | 12/2005 | Wang et al. | |
| 6,995,945 B2 | 2/2006 | Kohso et al. | |
| 7,068,451 B1 | 6/2006 | Wang et al. | |
| 2003/0184906 A1 | 10/2003 | Hanson et al. | |
| 2004/0080862 A1 * | 4/2004 | Miyata et al. ............. | 360/78.05 |

OTHER PUBLICATIONS

A. Sacks, M. Bodson, W. Messner, "Advanced Methods for Repeatable Runout Compensation", IEEE Transactions on Magnetics, vol. 31, No. 2, Mar. 1995, pp. 1031-1036.
J. Ishikawa and M. Tomizuka, "Pivot Friction Compensation Using an Accelerometer and a Disturbance Observer for Hard Disk Drives", IEEE/ASME Transactions on Mechatronics, vol. 3, No. 3, Sep. 1998, pp. 194-201.
Kemao Peng, et al., "Modeling and Compensation of Nonlinearities and Friction in a Micro Hard Disk Drive Servo System with Nonlinear Feedback Control", IEEE Transactions on Control Systems Technology, vol. 13, No. 5, Sep. 2005, pp. 708-721.
T. Yan and R. Lin, "Experimental Modeling and Compensation of Pivot Nonlinearity in Hard Disk Drives", IEEE Transactions on Magnetics, vol. 39, No. 2, Mar. 2003, pp. 1064-1069.
Jian Qin Gong, et al., "Modeling and Cancellation of Pivot Nonlinearity in Hard Disk Drives", IEEE Transactions on Magnetics, vol. 38, No. 5, Sep. 2002, pp. 3560-3565.

* cited by examiner

*Primary Examiner*—Jason C Olson
(74) *Attorney, Agent, or Firm*—Howard H. Sheerin, Esq.

(57) ABSTRACT

A disk drive is disclosed including a disk having a plurality of servo tracks, wherein each servo track comprises a plurality of servo sectors forming N servo wedges, and a wedge time period (WTP) occurs between each servo wedge. A VCM control signal is generated by generating an estimated WTP by detecting the servo sectors, estimating a pivot velocity in response to the estimated WTP, the pivot velocity representing a velocity of an actuator arm about a pivot, generating a pivot friction compensation in response to the estimated pivot velocity, and generating the VCM control signal in response to the pivot friction compensation.

20 Claims, 5 Drawing Sheets sign(v) = sign(dWTP/dt)

$P(k) = \text{sign}(v(k)) - \text{sign}(v(k-M))$ $g_c(k+1) = g_c(k) - \mu * PES(k) * P(k)$

DISK DRIVE EMPLOYING PIVOT FRICTION COMPENSATION

BACKGROUND OF THE INVENTION

1. Field of the Invention

The present invention relates to disk drives for computer systems. More particularly, the present invention relates to a disk drive employing pivot friction compensation.

2. Description of the Prior Art

Disk drives for computer systems typically comprise a disk rotated by a spindle motor with a head actuated over the disk in order to access data recorded in concentric tracks. The head is coupled to a distal end of an actuator arm which is rotated about a pivot by a voice coil motor (VCM) in order to seek the head to a target track, and then maintain the head over the track (tracking) while performing read or write operations. The position information for servoing the head comes from servo sectors recorded at periodic intervals around the circumference of the tracks. The servo sectors typically comprise coarse position information in the form of a digital track address, and fine position information in the form of servo bursts recorded at precise offsets relative to the centerline of each track.

During the tracking operation, the pivot bearings exhibit a friction (pivot friction) that introduces a non-linear disturbance into the servo system. As the pivot velocity approaches zero, the non-linear effect of the pivot friction dominates the mechanical dynamics of the servo system and degrades tracking performance. The effect of pivot friction is of particular concern in disk drives that exhibit eccentric tracks due, for example, to written-in errors while writing the servo sectors, non-centric alignment of the disk after servo writing (due to the disk slipping), or non-centric alignment of the disk when clamped to the spindle motor shaft (after servo writing with a media writer). In disk drives where the dominant eccentricity is due to a centric offset relative to the spindle motor shaft and the tracks, the velocity of the actuator arm will be sinusoidal with the rotation of the disk while tracking the eccentricity as illustrated in FIG. 1. The resulting pivot friction can be modeled as a square wave having an alternating sign as the pivot velocity approaches zero and reverses direction (mathematically the pivot friction can be represented as $f_c*sign(v)$ where v is the pivot velocity).

The prior art has suggested using an accelerometer for estimating the pivot velocity in order to compensate for pivot friction. However, accelerometers are complex and expensive to manufacture which increases the cost and complexity of the disk drive. The use of sophisticated observer based compensation modeling has also been suggested, but modeling error can lead to less than optimal performance.

There is, therefore, a need to compensate for pivot friction in a disk drive without using expensive accelerometers, and to avoid the modeling error of observer based compensation.

SUMMARY OF THE INVENTION

An embodiment of the present invention comprises a disk drive including a disk having a plurality of servo tracks, a head coupled to an actuator arm, and a voice coil motor (VCM) for rotating the actuator arm about a pivot to actuate the head over the disk. Each servo track comprises a plurality of servo sectors forming N servo wedges, and a wedge time period (WTP) occurs between each servo wedge. A VCM control signal is generated by generating an estimated WTP by detecting the servo sectors, estimating a pivot velocity in response to the estimated WTP, the pivot velocity representing a velocity of the actuator arm about the pivot, generating a pivot friction compensation in response to the estimated pivot velocity, and generating the VCM control signal in response to the pivot friction compensation.

In one embodiment, the estimated WTP is generated relative to:

$$RTP + \hat{a}*\cos(2\pi k/N) + \hat{b}*\sin(2\pi k/N)$$

where RTP is a reference time period corresponding to a nominal WTP, k is an index representing one of the servo wedges, and $\{\hat{a},\hat{b}\}$ are adjustable coefficients. In one embodiment, the coefficients $\{\hat{a},\hat{b}\}$ for generating the estimated WTP are adjusted according to:

$$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a gain, e(k) is a wedge time error generated in response to the difference between the estimated WTP and an actual WTP, and the actual WTP is generated by detecting the servo sectors.

In another embodiment, the pivot velocity is estimated relative to a derivative of the estimated WPT.

In yet another embodiment, the pivot friction compensation is generated relative to:

$$g_c(t)*sign(v)$$

where $g_c(t)$ is a gain and sign(v) represents a sign of the estimated pivot velocity. In one embodiment, the gain $g_c(t)$ is adaptable relative to:

$$g_c(k+1) = g_c(k) - \mu*PES(k)*P(k)$$

wherein k is an index representing one of the servo sectors, $\mu$ is a gain, PES(k) is a position error signal representing a radial location of the head and generated in response to the servo sector at index k, and P(k) is a train of pulses having an alternating sign and representing the effect of the pivot friction on the PES(k). In one embodiment, P(k) is generated according to:

$$sign(v(k)) - sign(v(k-M))$$

wherein v(k) is the estimated pivot velocity and M is a width of the pulses.

Another embodiment of the present invention comprises a disk drive including a disk having a plurality of servo tracks, a head coupled to an actuator arm, and a voice coil motor (VCM) for rotating the actuator arm about a pivot to actuate the head over the disk. A VCM control signal is generated by estimating a pivot velocity representing a velocity of the actuator arm about the pivot, and generating a pivot friction compensation relative to:

$$g_c(t)*sign(v)$$

where sign(v) represents a sign of the estimated pivot velocity, and $g_c(t)$ is a gain adaptable relative to:

$$g_c(k+1) = g_c(k) - \mu*PES(k)*P(k)$$

where k is an index representing one of the servo sectors, $\mu$ is a gain, PES(k) is a position error signal representing a radial location of the head and generated in response to the servo sector at index k, and P(k) is a train of pulses having an alternating sign and representing the effect of the pivot friction on the PES(k).

In one embodiment, P(k) is generated according to:

$$\text{sign}(v(k))-\text{sign}(v(k-M))$$

wherein v(k) is the estimated pivot velocity and M is a width of the pulses.

Another embodiment of the present invention comprises a method of compensating for pivot friction in a disk drive, the disk drive comprising a disk having a plurality of servo tracks, a head coupled to an actuator arm, and a voice coil motor (VCM) for rotating the actuator arm about a pivot to actuate the head over the disk. Each servo track comprises a plurality of servo sectors forming N servo wedges, and a wedge time period (WTP) occurs between each servo wedge. A VCM control signal is generated by generating an estimated WTP by detecting the servo sectors, estimating a pivot velocity in response to the estimated WTP, the pivot velocity representing a velocity of the actuator arm about the pivot, generating a pivot friction compensation in response to the estimated pivot velocity, and generating the VCM control signal in response to the pivot friction compensation.

Another embodiment of the present invention comprises a method of compensating for pivot friction in a disk drive, the disk drive comprising a disk having a plurality of servo tracks, a head coupled to an actuator arm, and a voice coil motor (VCM) for rotating the actuator arm about a pivot to actuate the head over the disk. A VCM control signal is generated by estimating a pivot velocity representing a velocity of the actuator arm about the pivot, and generating a pivot friction compensation relative to:

$$g_c(t)*\text{sign}(v)$$

where sign(v) represents a sign of the estimated pivot velocity, and $g_c(t)$ is a gain adaptable relative to:

$$g_c(k+1)=g_c(k)-\mu*PES(k)*P(k)$$

where k is an index representing one of the servo sectors, μ is a gain, PES(k) is a position error signal representing a radial location of the head and generated in response to the servo sector at index k, and P(k) is a train of pulses having an alternating sign and representing the effect of the pivot friction on the PES(k).

DESCRIPTION OF THE PREFERRED EMBODIMENTS

Figure 1:
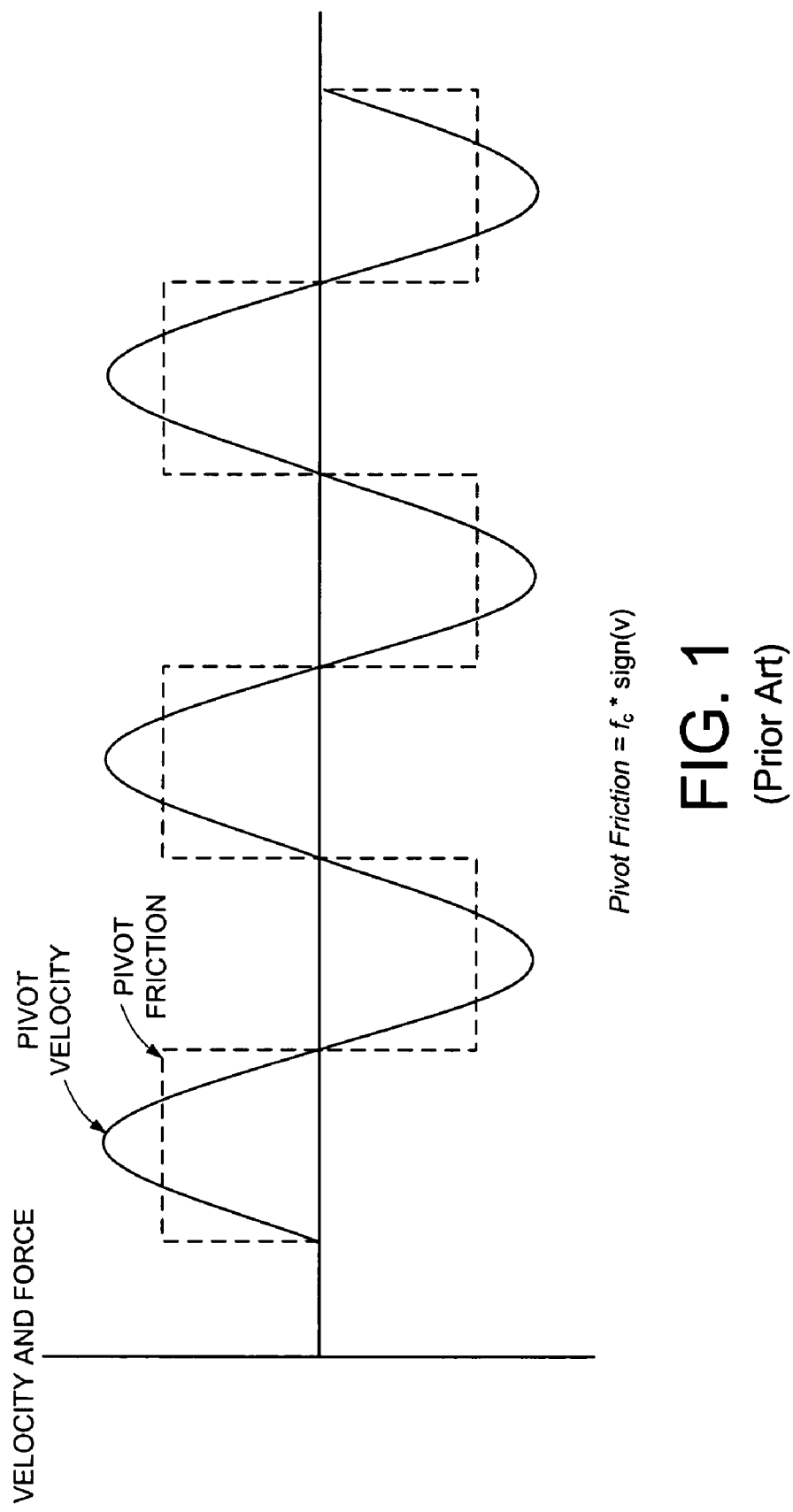
FIG. 1 shows prior art pivot friction represented as a square wave having an alternating sign as the pivot velocity approaches zero and reverses direction.
Figure 2:
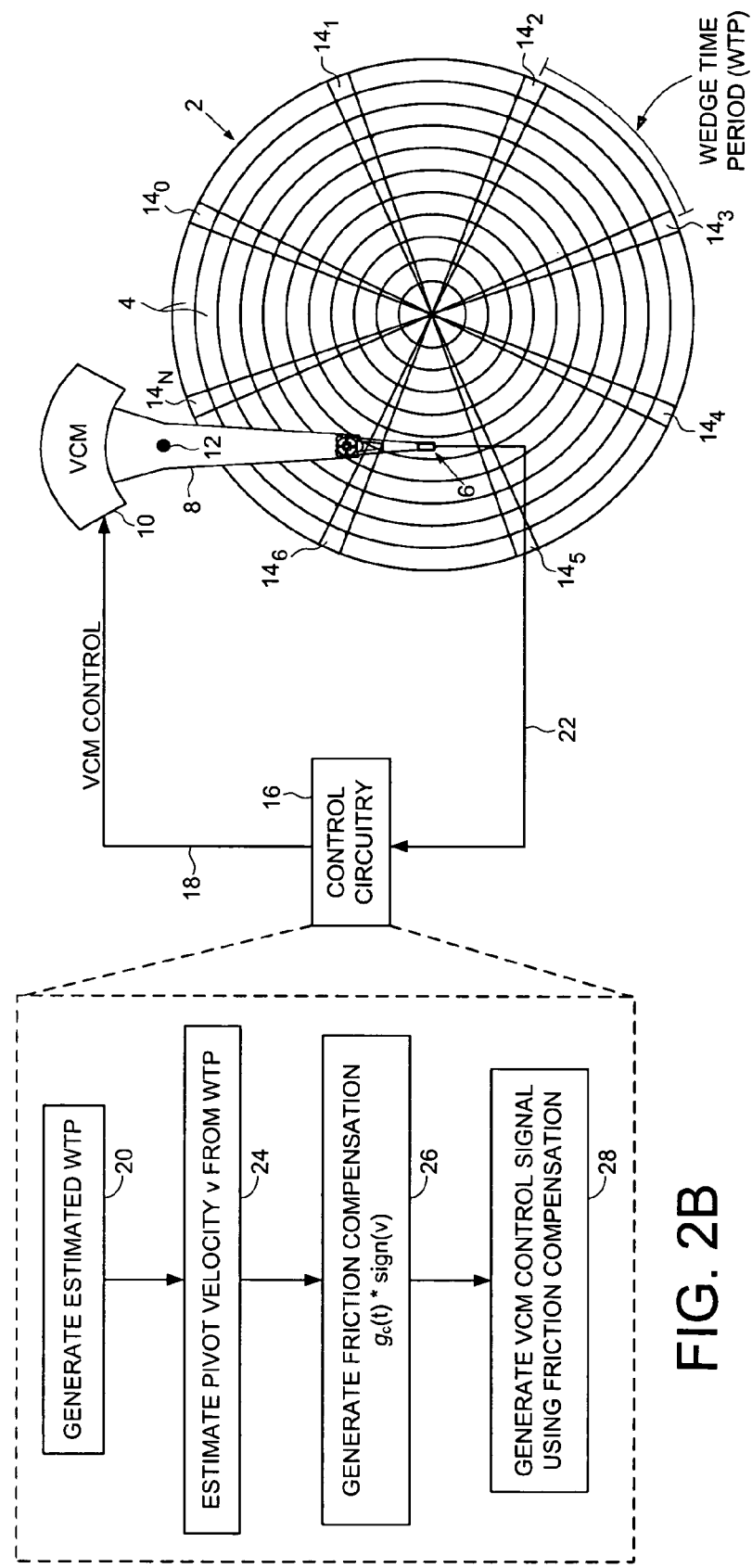
FIG. 2A shows a disk drive according to an embodiment of the present invention including control circuitry for generating a VCM control signal in response to a pivot friction compensation.
FIG. 2B is a flow diagram for generating the pivot friction compensation by estimating a pivot velocity from a wedge time period (WTP) according to an embodiment of the present invention.

FIG. 2A shows a disk drive according to an embodiment of the present invention comprising a disk 2 having a plurality of servo tracks 4, a head 6 coupled to an actuator arm 8, and a voice coil motor (VCM) 10 for rotating the actuator arm 8 about a pivot 12 to actuate the head 6 over the disk 2. Each servo track 4 comprises a plurality of servo sectors forming N servo wedges $14_0$-$14_N$, and a wedge time period (WTP) occurs between each servo wedge. Control circuitry 16 generates a VCM control signal 18 by executing the flow diagram of FIG. 2B. At step 20 an estimated WTP is generated by detecting the servo sectors from a read signal 22, and at step 24 a pivot velocity is estimated in response to the estimated WTP, wherein the pivot velocity represents a velocity of the actuator arm 8 about the pivot 12. At step 26 a pivot friction compensation is generated in response to the estimated pivot velocity, and at step 28 the VCM control signal 18 is generated in response to the pivot friction compensation.

In one embodiment, each servo sector in the servo wedges $14_0$-$14_N$ comprises a sync mark, and the WTP is represented as a time period between sync marks. For example, as each sync mark in each servo wedge is detected, the difference in a timer may represent an actual WTP. In one embodiment, the estimated WTP is generated relative to:

$$RTP+\hat{a}*\cos(2\pi k/N)+\hat{b}*\sin(2\pi k/N)+\hat{b}*\sin(2\pi k/N) \quad (1)$$

where RTP is a reference time period corresponding to a nominal WTP, k is an index representing one of the servo wedges, and $\{\hat{a},\hat{b}\}$ are adjustable coefficients. In one embodiment, the coefficients $\{\hat{a},\hat{b}\}$ for generating the estimated WTP are adjusted according to:

$$\hat{a}(k+1)=\hat{a}(k)-G*e(k)*\cos(2\pi k/N)$$

$$\hat{b}(k+1)=\hat{b}(k)-G*e(k)*\sin(2\pi k/N) \quad (2)$$

where G is a gain, and e(k) is a wedge time error generated in response to a difference between the estimated WTP and the actual WTP.

Figure 3:
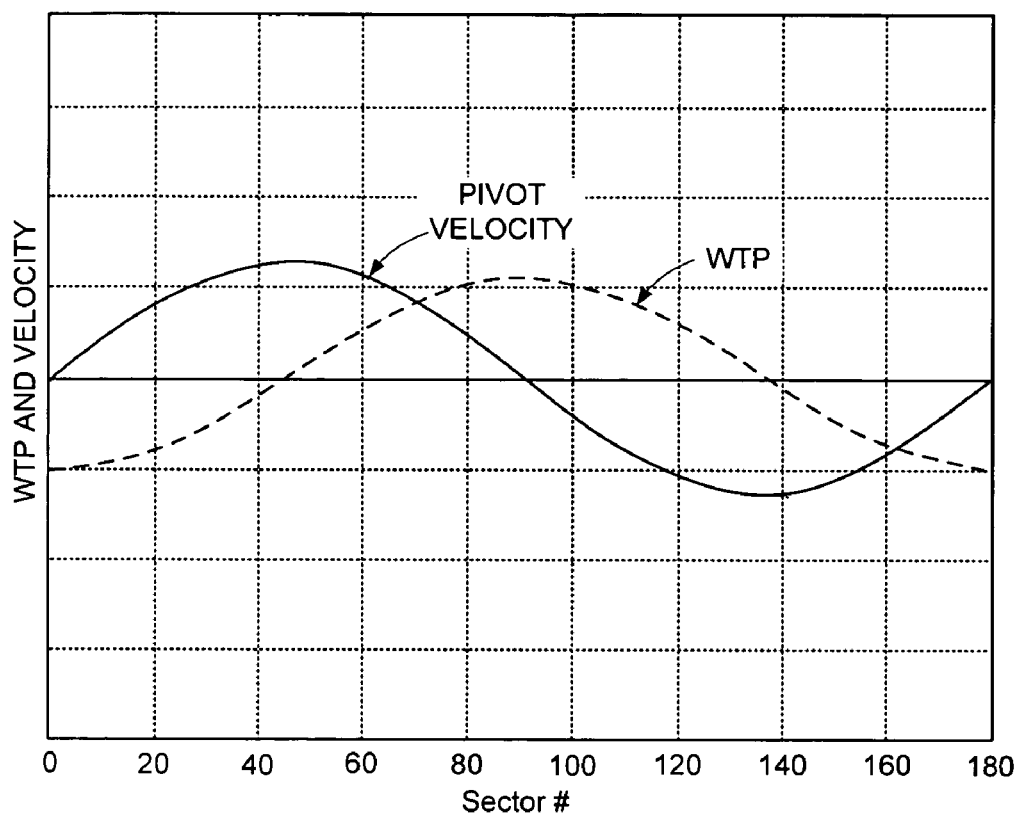
FIG. 3 shows how in one embodiment the pivot velocity is estimated as the derivative of the WTP.

In one embodiment, the pivot velocity is estimated relative to a derivative of the estimated WPT as illustrated in FIG. 3. The derivative of the estimated WTP is generated by taking the derivative of equation (1) to estimate the pivot velocity as:

$$[\hat{b}*\cos(2\pi k/N)-\hat{a}*\sin(2\pi k/N)]*2\pi/N \quad (3)$$

where any suitable units of velocity may be employed, and the units may be scaled or converted in any suitable manner. In one embodiment, the coefficients $\{\hat{a},\hat{b}\}$ are adapted over one or more revolutions of the disk using equation (2). A number of different coefficients $\{\hat{a},\hat{b}\}$ may be adapted corresponding to a number of different radial locations of the head 6 in order to compensate for changes in the WPT over the disk radius. Once the coefficients $\{\hat{a},\hat{b}\}$ are determined, the pivot velocity can be estimated using equation (3).

Figure 4:
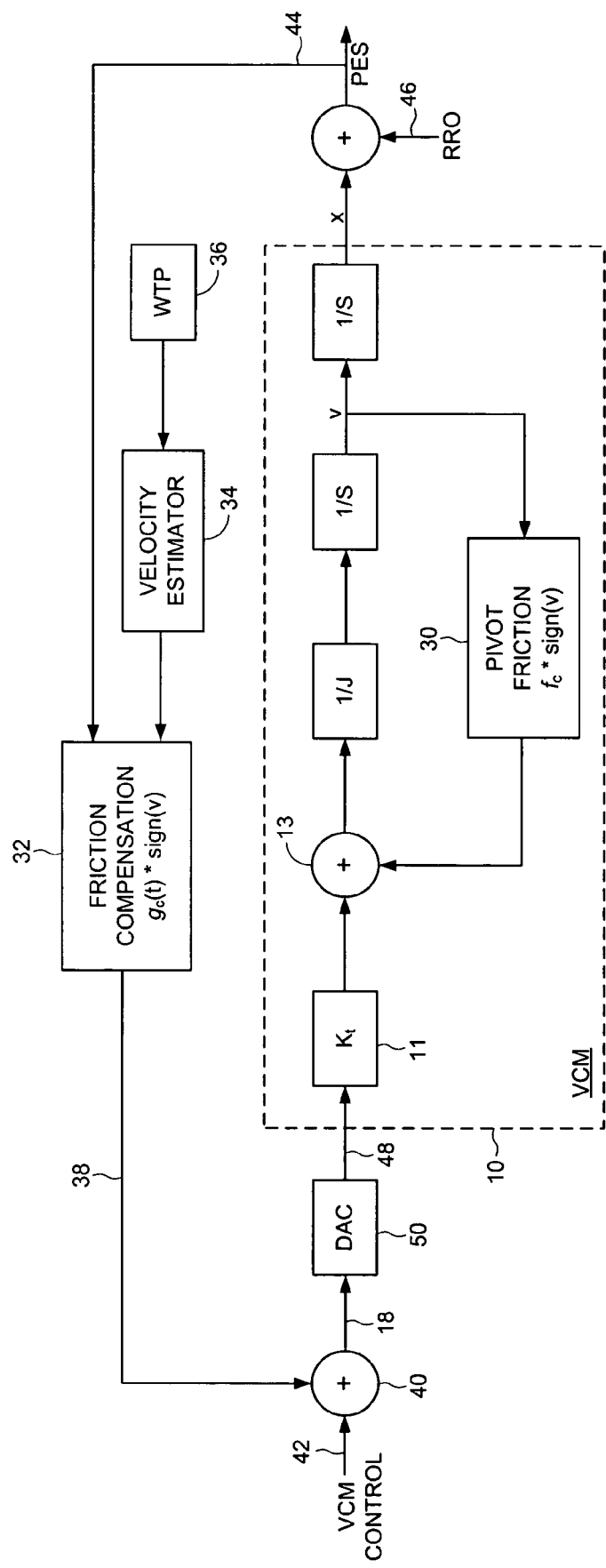
FIG. 4 shows control circuitry according to an embodiment of the present invention for generating the VCM control signal in response to the pivot friction compensation.

FIG. 4 shows example control circuitry according an embodiment of the present invention for generating the VCM control signal 18 in response to the pivot friction compensation. The VCM 10 is modeled as a double integrator with a suitable torque constant $K_t$ 11, wherein the pivot friction 30 is represented as $f_c*\text{sign}(v)$ (v is the pivot velocity) added as a disturbance at adder 13. Accordingly, in the embodiment of FIG. 4 the pivot friction compensation 32 is generated according to:

$$g_c(t)*\text{sign}(v)$$

where $g_c(t)$ is a gain and sign(v) represents a sign of the pivot velocity estimated by a velocity estimator 34 using equation (3) by finding the sign of:

$$[\hat{b}*\cos(2\pi k/N)-\hat{a}*\sin(2\pi k/N)] \quad (4)$$

The velocity estimator 34 processes the detected WTP 36 in order to adapt the coefficients $\{\hat{a},\hat{b}\}$ of equation (4) as described above. The pivot friction compensation output on line 38 is combined with an initial VCM control signal 42 computed in response to the position error signal (PES) 44 and a feed forward compensation value that compensates for the repeatable runout (RRO) 46 due to the eccentricity. The VCM control signal 18 is converted to an analog control signal 48 by a digital-to-analog converter (DAC) 50.

Figure 5:
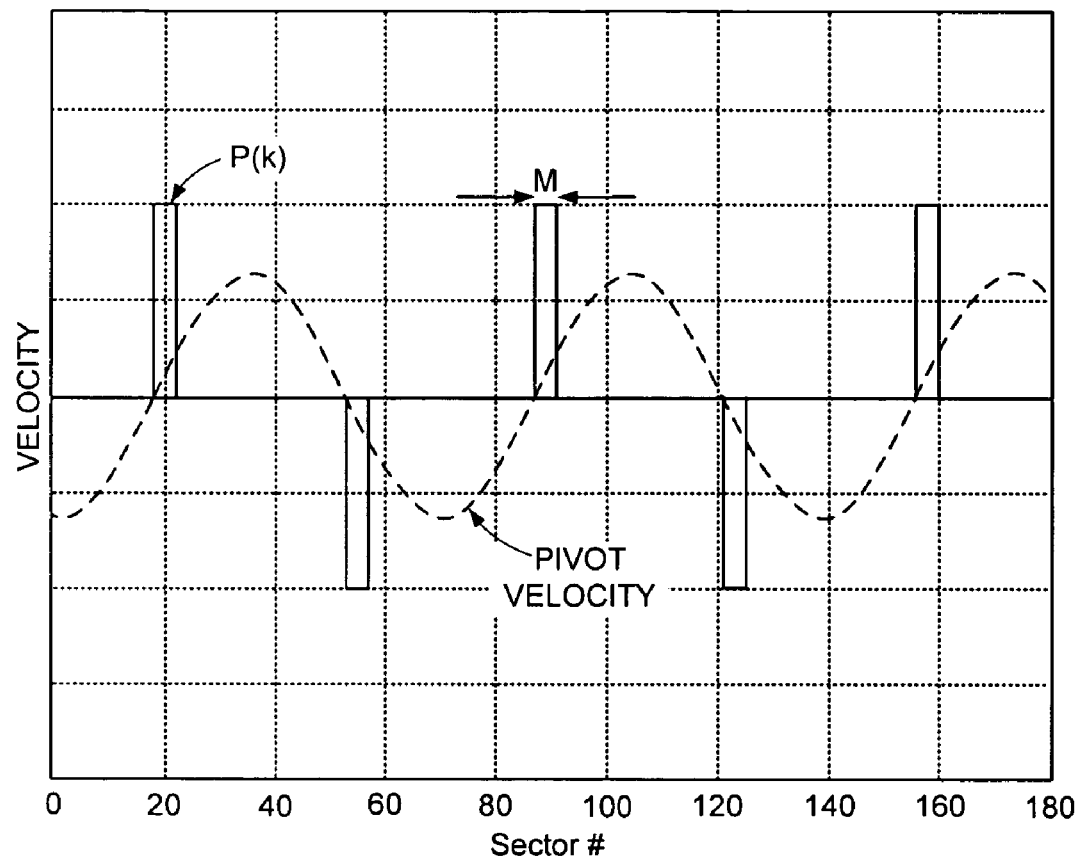
FIG. 5 shows how in one embodiment a gain value used to generate the pivot friction compensation is adapted in response to a pulse train that estimates the pivot friction and a position error signal (PES) affected by the pivot friction.

In one embodiment, the gain $g_c(t)$ in the pivot friction compensation 32 is adaptable relative to:

$$g_c(k+1)=g_c(k)-\mu*PES(k)*P(k)$$

where k is an index representing one of the servo sectors, $\mu$ is a gain, PES(k) is the position error signal 44 representing a radial location of the head and generated in response to the servo sector at index k, and P(k) is a train of pulses having an alternating sign and representing the effect of the pivot friction on PES(k). In one embodiment, P(k) is generated according to:

$$\text{sign}(v(k))-\text{sign}(v(k-M))$$

wherein v(k) is the estimated pivot velocity and M is a width of the pulses as illustrated in FIG. 5.

In one embodiment, the width M of the pulses P(k) in FIG. 5 are determined during a calibration procedure, and in one embodiment, while adapting the coefficients $\{\hat{a},\hat{b}\}$ of equation (3). For example, the coefficients $\{\hat{a},\hat{b}\}$ may be initialized to a minimal value ensuring that the PES 44 will have a non-zero value due to the effect of pivot friction. When the pivot velocity changes sign, the PES is evaluated to determine a suitable width M for the pulses P(k). For example, the width M may represent a period that the PES exceeds a predetermined threshold due to the effect of pivot friction after the pivot velocity changes sign.

We claim:

1. A disk drive comprising:
   (a) a disk comprising a plurality of servo tracks, wherein:
      each servo track comprises a plurality of servo sectors forming N servo wedges; and
      a wedge time period (WTP) occurs between each servo wedge;
   (b) a head coupled to an actuator arm;
   (c) a voice coil motor (VCM) for rotating the actuator arm about a pivot to actuate the head over the disk; and
   (d) control circuitry for generating a VCM control signal applied to the VCM by:
      generating an estimated WTP by detecting the servo sectors;
      estimating a pivot velocity in response to the estimated WTP, the pivot velocity representing a velocity of the actuator arm about the pivot;
      generating a pivot friction compensation in response to the estimated pivot velocity; and
      generating the VCM control signal in response to the pivot friction compensation.

2. The disk drive as recited in claim 1, wherein the estimated WTP is generated relative to:

$$RTP+\hat{a}*\cos(2\pi k/N)+\hat{b}*\sin(2\pi k/N)$$

where RTP is a reference time period corresponding to a nominal WTP, k is an index representing one of the servo wedges, and $\{\hat{a},\hat{b}\}$ are adjustable coefficients.

3. The disk drive as recited in claim 2, wherein the coefficients $\{\hat{a},\hat{b}\}$ for generating the estimated WTP are adjusted according to:

$$\hat{a}(k+1)=\hat{a}(k)-G*e(k)*\cos(2\pi k/N)$$

$$\hat{b}(k+1)=\hat{b}(k)-G*e(k)*\sin(2\pi k/N)$$

wherein:
   G is a gain;
   e(k) is a wedge time error generated in response to the difference between the estimated WTP and an actual WTP; and
   the actual WTP is generated by detecting the servo sectors.

4. The disk drive as recited in claim 1, wherein the pivot velocity is estimated relative to a derivative of the estimated WPT.

5. The disk drive as recited in claim 1, wherein the pivot friction compensation is generated relative to:

$$g_c(t)*\text{sign}(v)$$

where $g_c(t)$ is a gain and sign(v) represents a sign of the estimated pivot velocity.

6. The disk drive as recited in claim 5, wherein the gain $g_c(t)$ is adaptable.

7. The disk drive as recited in claim 6, wherein the gain $g_c(t)$ is adaptable relative to:

$$g_c(k+1)=g_c(k)-\mu*PES(k)*P(k)$$

wherein:
   k is an index representing one of the servo sectors;
   $\mu$ is a gain;
   PES(k) is a position error signal representing a radial location of the head and generated in response to the servo sector at index k; and
   P(k) is a train of pulses having an alternating sign and representing the effect of the pivot friction on the PES (k).

8. The disk drive as recited in claim 7, wherein P(k) is generated according to:

$$\text{sign}(v(k))-\text{sign}(v(k-M))$$

wherein v(k) is the estimated pivot velocity and M is a width of the pulses.

9. A method of compensating for pivot friction in a disk drive, the disk drive comprising a disk having a plurality of servo tracks, a head coupled to an actuator arm, and a voice coil motor (VCM) for rotating the actuator arm about a pivot to actuate the head over the disk, wherein each servo track comprises a plurality of servo sectors forming N servo wedges, and a wedge time period (WTP) occurs between each servo wedge, the method comprising:
   generating an estimated WTP by detecting the servo sectors;
   estimating a pivot velocity in response to the estimated WTP, the pivot velocity representing a velocity of the actuator arm about the pivot;
   generating a pivot friction compensation in response to the estimated pivot velocity;
   generating a VCM control signal in response to the pivot friction compensation; and
   applying the VCM control signal to the VCM.

10. The method as recited in claim 9, wherein the estimated WTP is generated relative to:

$$RTP+\hat{a}*\cos(2\pi k/N)+\hat{b}*\sin(2\pi k/N)$$

where RTP is a reference time period corresponding to a nominal WTP, k is an index representing one of the servo wedges, and {â,ɓ} are adjustable coefficients.

11. The method as recited in claim 10, wherein the coefficients {â,ɓ} for generating the estimated WTP are adjusted according to:

$$â(k+1)=â(k)-G*e(k)*\cos(2\pi k/N)$$

$$ɓ(k+1)=ɓ(k)-G*e(k)*\sin(2\pi k/N)$$

wherein:
G is a gain;
e(k) is a wedge time error generated in response to the difference between the estimated WTP and an actual WTP; and
the actual WTP is generated by detecting the servo sectors.

12. The method as recited in claim 9, wherein the pivot velocity is estimated relative to a derivative of the estimated WPT.

13. The method as recited in claim 9, wherein the pivot friction compensation is generated relative to:

$$g_c(t)*\text{sign}(v)$$

where $g_c(t)$ is a gain and sign(v) represents a sign of the estimated pivot velocity.

14. The method as recited in claim 13, wherein the gain $g_c(t)$ is adaptable.

15. The method as recited in claim 14, wherein the gain $g_c(t)$ is adaptable relative to:

$$g_c(k+1)=g_c(k)-\mu*PES(k)*P(k)$$

wherein:
k is an index representing one of the servo sectors;
μ is a gain;
PES(k) is a position error signal representing a radial location of the head and generated in response to the servo sector at index k; and
P(k) is a train of pulses having an alternating sign and representing the effect of the pivot friction on the PES(k).

16. The method as recited in claim 15, wherein P(k) is generated according to:

$$\text{sign}(v(k))-\text{sign}(v(k-M))$$

wherein v(k) is the estimated pivot velocity and M is a width of the pulses.

17. A disk drive comprising:
(a) a disk comprising a plurality of servo tracks;
(b) a head coupled to an actuator arm;
(c) a voice coil motor (VCM) for rotating the actuator arm about a pivot to actuate the head over the disk; and
(d) control circuitry for generating a VCM control signal by:
estimating a pivot velocity representing a velocity of the actuator arm about the pivot; and
generating a pivot friction compensation relative to:

$$g_c(t)*\text{sign}(v)$$

wherein:
sign(v) represents a sign of the estimated pivot velocity; and
$g_c(t)$ is a gain adaptable relative to:

$$g_c(k+1)=g_c(k)-\mu*PES(k)*P(k)$$

where:
k is an index representing one of the servo sectors;
μ is a gain;
PES(k) is a position error signal representing a radial location of the head and generated in response to the servo sector at index k; and
P(k) is a train of pulses having an alternating sign and representing the effect of the pivot friction on the PES(k).

18. The disk drive as recited in claim 17, wherein P(k) is generated according to:

$$\text{sign}(v(k))-\text{sign}(v(k-M))$$

wherein v(k) is the estimated pivot velocity and M is a width of the pulses.

19. A method of compensating for pivot friction in a disk drive, the disk drive comprising a disk having a plurality of servo tracks, a head coupled to an actuator arm, and a voice coil motor (VCM) for rotating the actuator arm about a pivot to actuate the head over the disk, the method comprising:
estimating a pivot velocity representing a velocity of the actuator arm about the pivot; and
generating a pivot friction compensation relative to:

$$g_c(t)*\text{sign}(v)$$

wherein:
sign(v) represents a sign of the estimated pivot velocity; and
$g_c(t)$ is a gain adaptable relative to:

$$g_c(k+1)=g_c(k)-\mu*PES(k)*P(k)$$

where:
k is an index representing one of the servo sectors;
μ is a gain;
PES(k) is a position error signal representing a radial location of the head and generated in response to the servo sector at index k; and
P(k) is a train of pulses having an alternating sign and representing the effect of the pivot friction on the PES(k).

20. The method as recited in claim 19, wherein P(k) is generated according to:

$$\text{sign}(v(k))-\text{sign}(v(k-M))$$

wherein v(k) is the estimated pivot velocity and M is a width of the pulses.

* * * * *